United States Patent Office 3,207,832
Patented Sept. 21, 1965

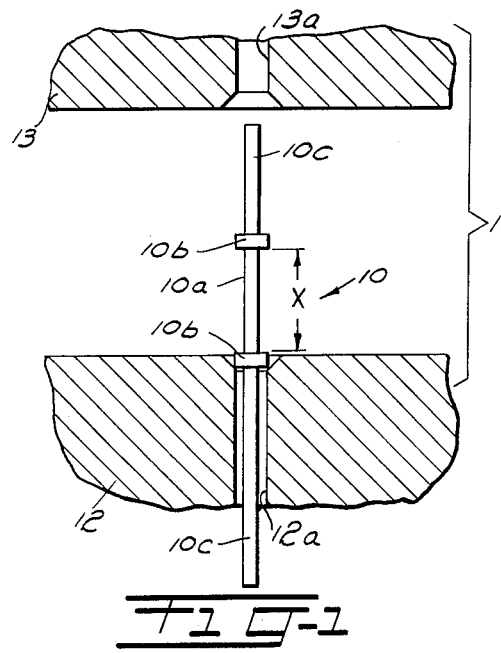
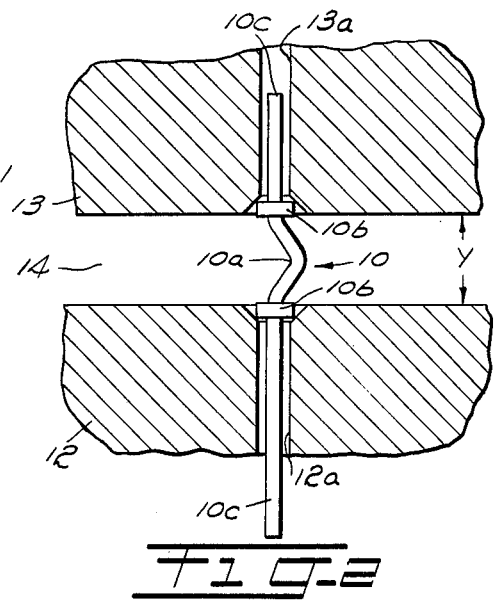
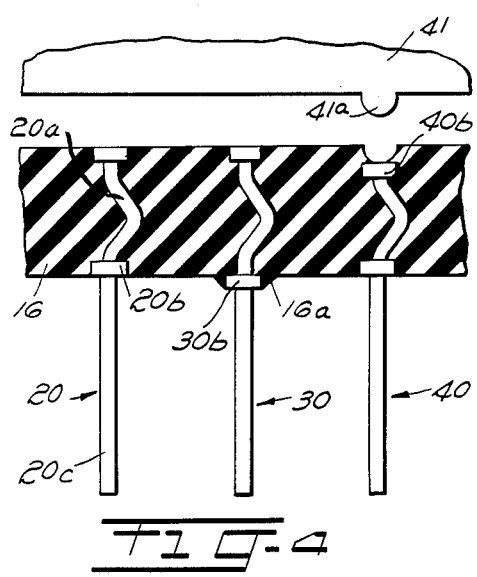
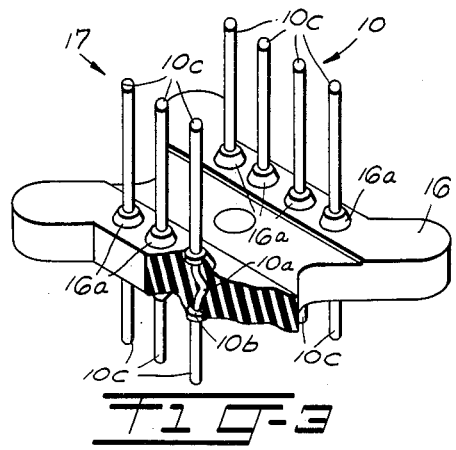

3,207,832
METHOD OF MAKING PLASTIC ARTICLE HAVING METALLIC INSERT
Dante J. Patti, Middletown, R.I., and Leonard J. Winn, Lexington, Mass., assignors to Western Electric Company, Incorporated, New York, N.Y., a corporation of New York
Filed Oct. 18, 1962, Ser. No. 231,526
4 Claims. (Cl. 264—272)

The present invention relates generally to methods of making plastic articles having metallic inserts. More particularly, the invention relates to plastic articles having a plurality of metallic terminals secured thereto and projecting therefrom, and to methods of making such articles. Accordingly, the general objects of the invention are to provide new and improved articles and methods of such character.

A great number of plastic articles of many different types having metallic terminals are now being used in the electrical and communications industries. Such articles may comprise, for example, terminal blocks or spools on which wires are wound to form electrical components like inductors and resistors. In the past, the necessary terminals were generally headed or knurled metallic wires of a fairly stiff character, which were inserted through close fitting apertures in the molds used for molding the plastic about the terminals. The plastics commonly used in this type of operation comprise a wide range of thermoplastic and thermosetting resins; for example, nylon, phenolics, alkyl resins and polydiallyl phthalate resins. These plastics were frequently fiber or glass-filled for strength and to obtain desirable electrical properties.

Various problems arose in the prior method of molding the plastic article about the terminals, particularly (1) flashing of the plastic about the terminals, and (2) obtaining a high degree of resistance to torsional forces applied to the terminals.

Another object of the invention is to provide a method of making a plastic article with metallic terminals (or similar object requiring metallic inserts in a plastic body) wherein the terminals or inserts are placed in the mold in such a manner as to obviate the flashing and torsional-forces problems mentioned in the preceding paragraph.

With the foregoing and other objects in view, the present invention contemplates the molding of an article of a plastic resin having an elongated metallic insert secured therein and projecting therefrom. The insert is provided with an intermediate base or shank portion, a pair of enlarged heads adjacent to the ends of the shank portion, and an end portion projecting beyond at least one of the heads. The insert is placed into a mold having an aperture in which the end portion of the insert is received so that one of the heads seats in and seals off the aperture. The mold is then closed so as to cause relative movement of the heads toward each other to bend the shank portion of the insert. Plastic material is then introduced into the mold cavity so that the plastic surrounds the base portion of the insert and the interior portions of the heads to secure the insert in the article when the plastic solidifies. The bent shank portion serves to secure the insert against torsional forces applied thereto and, in cooperation with the two heads, serves to eliminate flashing. Preferably, the distance between the inner surfaces of the heads after the mold has been closed is between 60 and 90 percent of the original length of the base portion prior to bending.

Other objects, advantages and features of the invention will be apparent from the following detailed description of specific embodiments thereof, when taken in conjunction with the appended drawings, in which:

FIG. 1 is a fragmentary cross-sectional view of a mold and terminal in accordance with the invention, with the mold parts in open position;

FIG. 2 is a view similar to FIG. 1, showing the mold in closed position prior to molding;

FIG. 3 is an isometric view of a completed terminal strip in accordance with the invention, with a portion broken away to reveal the manner in which the bent terminal is embedded in the plastic; and FIG. 4 is a cross-sectional view through a terminal block similar to that of FIG. 3, but illustrating alternative terminal configurations which may be used.

Referring now in detail to the drawings, and particularly to FIG. 1, there is illustrated an elongated insert or terminal 10 in accordance with one example of the invention, which is made of a suitable electrically conducting material such as a tin and copper-plated hard brass alloy. The terminal 10 includes a shank portion 10–a, a pair of enlarged heads 10–b adjacent to the ends of the shank portion 10–a, and a pair of end portions 10–c projecting beyond the heads 10–b. In the illustrative embodiment shown, the terminals 10 are cylindrical, although other cross-sectional shapes for all or any portion of the terminals may be used where desired.

The terminal 10 is placed into a mold 11 having a lower mold section 12 with an aperture 12–a in which one of the end portions 10–c is received so that one of the heads 10–b seats in and seals off the aperture 12–a as shown in FIG. 1. One of the important advantages of the invention is that the fit between the mold aperture 12–a and the end portion 10–c is not particularly critical, as the flashing of excess plastic through the aperture 12–a is precluded by the oversize head 10–b. After the terminal 10 has been placed in the lower mold section 12, the mold 11 is closed, as by moving an upper mold section 13 toward the lower section 12 from the position of FIG. 1 to that of FIG. 2. The upper end portion 10–c of the terminal 10 is similarly received in an aperture 13–a in the upper mold section 13 as the mold closes so that the upper head 10–b seats in and seals off the aperture 13–a.

The opposing faces of the mold sections 12 and 13 define portions of the mold cavity 14 in which the plastic article is to be formed. Necessarily, the distance between the opposing faces of the sections 12 and 13 is dictated by the desired width of the plastic article to be formed; however, the original length X of the base portion 10–a (the distance between the inner surfaces of the heads 10–b, as shown in FIG. 1) is not so dictated. The length X is critically selected to be great enough that, when the mold is closed, the upper mold section 13 engages the upper terminal head 10–b and forces it toward the lower head 10–b as illustrated in FIG. 2. This action functions to bend the shank portion 10–a of the terminal to a configuration such as is illustrated in FIG. 2.

The bending of the shank portion 10–a serves to force the terminal heads 10–b tightly into the mold apertures 12–a, so as to eliminate any tendency of the plastic to be molded in the cavity 14 to flash around the terminal end portions 10–c through the apertures 12–a and 13–a even though the end portions 10–c may fit loosely in the apertures. For this reason, no reaming out of these apertures 12–a and 13–a is required as there is no flash and plastic does not tend to build up on the walls of the apertures. In the example illustrated, because of the design of the desired product, the apertures 12–a and 13–a are flared adjacent to the mold cavity; however, the particular shape is not critical so long as the heads 10–b are correspondingly shaped and sized to seat in and seal off the apertures adjacent to the mold cavity 14.

After the mold has been closed to the position illustrated in FIG. 2, the plastic article of desired shape is formed in the mold cavity 14 according to any of the various well known molding techniques. As the plastic fills the cavity 14, it completely surrounds the bent shank portion 10–a of the terminal and the interior portions of the heads 10–b so as to secure the terminal 10 in the plastic article 16, as shown in FIG. 3 with respect to a completed terminal strip 17 having two rows of four terminals each.

The two heads 10–b serve to hold the terminal 10 securely in the article against longitudinal forces applied thereto, and the bent shank portion 10–a functions to secure the terminal 10 against torsional forces applied thereto in addition to the previously mentioned function of forcing the heads 10–b tightly into the apertures 12–a and 13–a to prevent flashing.

The exact amount of the bend may readily be determined empirically for any given application; however, the bend (1) must be sufficient to achieve the dual functions of forcing the heads tightly into the mold apertures and preventing rotation of the terminals in response to torsional forces, and (2) must of course not be so great as to break the terminal as the mold is closed. A preferred range for the bend is such that the distance Y (FIG. 2) between the inner surfaces of the heads 10–b after the mold has been closed is between 60 and 90 percent of the original length X (FIG. 1) of the base portion 10–a prior to bending.

While the particular terminal 10 illustrated in FIGS. 1 to 3 is a two-ended terminal projecting from both sides of the terminal strip 17 of FIG. 3, other arrangements may be utilized such as those illustrated in FIG. 4. The terminal 20 in FIG. 4 is similarly molded in a plastic article or block 16 and is provided with a bent shank portion 20–a, a pair of enlarged heads 20–b, and a single projecting end portion 20–c. The heads of the terminal 20 are flush with the outer surface of the plastic body 16, no chamfer (such as that indicated by the numeral 16–a in FIG. 3) being provided since a mold without flared apertures is utilized.

The terminal 30 in FIG. 4 is the same as the terminal 20 except that the plastic is formed with a chamfer 16–a about the bottom head 30–b as was the case in FIG. 3. The terminal 40 is the same as the terminal 20 as regards the bottom portion, but differs at the top in that the upper head 40–b is sunk below the upper surface of the plastic body 16. To accomplish this, an upper mold section 41 is utilized having a button-like projection 41–a on the under surface thereof.

From the foregoing explanation of the invention, it will be apparent that a molding method has been devised which eliminates the flashing problems of the prior art through the use of a two-headed insert having a bent mid-section, and that a novel article is thereby produced wherein the insert is securely locked in place and is substantially immune to torsional forces tending to rotate the insert about its longitudinal axis.

While various specific examples and embodiments of the invention have been described in detail hereinabove, it will be obvious that various modifications may be made from the specific details described without departing from the spirit and scope of the invention.

What is claimed is:

1. The method of making a plastic article having a metallic insert secured therein and projecting therefrom, which comprises the following steps:

providing an elongated metallic insert having (1) a shank portion, (2) a pair of enlarged heads adjacent to the ends of the shank portion, and (3) an end portion projecting beyond at least one of the heads;

placing the insert into a mold having an aperture in which the end portion of the insert is received so that one of the heads seats in the aperture;

closing the mold in such a manner as to move the heads relatively toward each other with such a force as to bend the shank portion of the insert in a direction transverse to the applied force and to enable the one head to seal off the aperture in order to prevent the development of flash within the aperture; and forming the plastic article in the mold cavity so that the plastic surrounds the bent shank portion of the insert and the interior portions of the heads to secure the insert in the article.

2. The method of making a plastic article having a plurality of metallic terminals secured therein and projecting therefrom, which comprises the following steps:

providing a plurality of elongated metallic inserts having a (1) cylindrical shank portion, (2) a pair of enlarged cylindrical heads adjacent to the ends of the shank portion, and (3) a cylindrical end portion projecting beyond at least one of the heads;

placing the terminals into a mold having a plurality of parallel apertures in which the end portions of the terminals are received so that one head of each terminal seats in and seals off a corresponding aperture;

closing the mold in such a manner as to force one head of each terminal toward the other to bend the shank portion of each terminal in a direction transverse to the applied force so that the distance between the inner surfaces of the heads of each terminal after the mold has been closed is between 60 and 90 percent of the original length of the shank portion prior to bending; and forming the plastic article in the mold cavity so that the plastic surrounds the shank portion of each terminal and the interior portions of the heads to secure the terminals in the article and is prevented from flashing through the mold apertures by the enlarged cylindrical heads which are forced into the apertures to form a seal.

3. The method of producing a flash-free molded terminal block, having one or more elongated terminals projecting therefrom, each including a pair of uniformly projecting peripheral portions at spaced intervals intermediate the terminal ends, which comprises the steps of:

positioning at least one terminal in an aperture in a lower mold member such that one of the projecting peripheral portions seats in a tapered entrance portion thereof while the end terminal portion extends therethrough, moving a second mold member a predetermined distance to engage the other end portion of the terminal in an aperture having a tapered entrance portion and seat the other projecting peripheral portion in said tapered portion, compressing the terminal portion intermediate the projecting peripheral portions into a bowed configuration and simultaneously forcing the projecting peripheral portions firmly into the respective tapered entrance portions to seal the terminal apertures whereby flash is prevented within the mold apertures by the projecting peripheral portions of the terminal, and injecting a molding material into the mold cavity between the upper and lower members, such that the material forms about the bowed terminal portion to lock the terminal in place.

4. The method of producing a molded terminal block having one or more elongated terminals projecting therefrom each including a pair of uniformly projecting peripheral portions at spaced intervals intermediate the terminal ends wherein the terminal block is entirely free of molding flash about the terminals, comprising the steps of:

providing a first mold member having at least one aperture extending therethrough including a tapered entrance portion to receive a terminal, positioning a terminal in each mold aperture such that one of the projecting peripheral portions seats in the tapered entrance portion while the corresponding terminal end portion extends therethrough, providing a second mold member directly opposite the first member having a predetermined number of apertures extending therethrough each corresponding to an aperture in the first member, moving the upper mold portion a predetermined distance to engage the other end portion of the terminal in an aperture having a tapered entrance portion and seat the other projecting peripheral portion in said tapered portion, compressing the terminal portion intermediate the projecting peripheral portions into a bowed configuration and simultaneously forcing the projecting peripheral portions firmly into the respective tapered entrance portions to seal the terminal apertures whereby flash is prevented within the mold apertures by the projecting peripheral portions of the terminal, and injecting a molding material into the mold cavity between the first and second mold members such that the material forms about the bowed terminal portion to lock the terminal in place.

References Cited by the Examiner

UNITED STATES PATENTS

| | | | |
|---|---|---|---|
| 1,983,267 | 12/34 | Browne et al. | 264—271 |
| 2,040,674 | 5/36 | Severance et al. | 264—277 |
| 2,082,992 | 6/37 | Wallace | 264—272 |
| 2,937,409 | 5/60 | Cole | 264—276 |
| 3,042,896 | 7/62 | Doktor | 339—198 |
| 3,054,165 | 9/62 | Braun et al. | 29—155.55 |
| 3,069,753 | 12/62 | Lalmond et al. | 29—155.55 |
| 3,072,879 | 1/63 | Crowther | 339—198 |
| 3,081,497 | 3/63 | Scherry | 264—276 |

FOREIGN PATENTS 50,982   4/41   Netherlands.

ROBERT F. WHITE, *Primary Examiner.*

ALEXANDER H. BRODMERKEL, *Examiner.*